3,089,929
VIBRATION RESPONSIVE SWITCH
Frank W. Murphy, Tulsa, Okla., assignor of one-half to Frank W. Murphy, Jr., Tulsa, Okla.
Filed Oct. 13, 1960, Ser. No. 62,353
7 Claims. (Cl. 200—61.45)

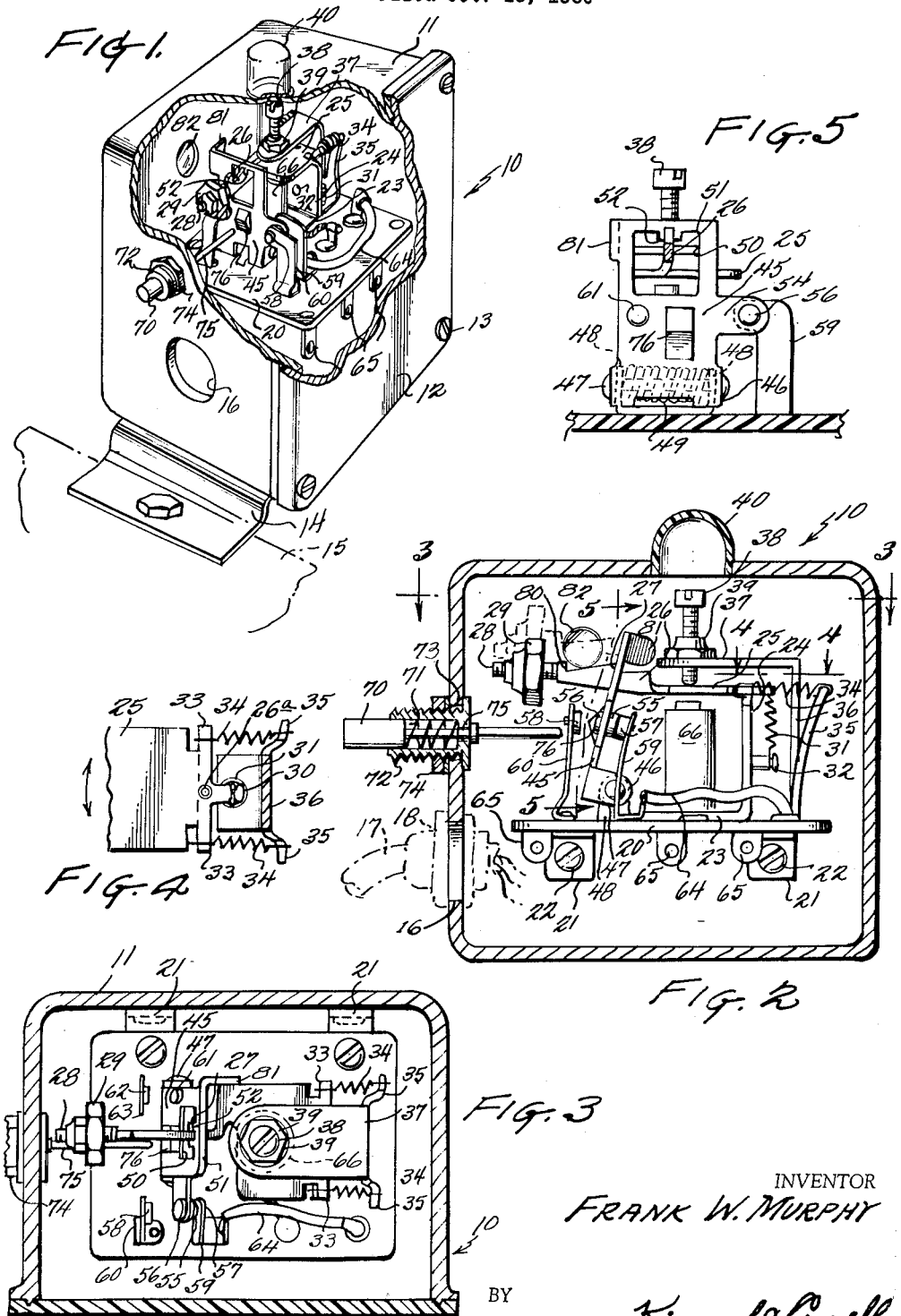

This invention relates to a vibration responsive switch and has as its primary object the provision of a switch which will protect operating machinery by shutting off the power source, or sounding alarms or the like upon any severe or undue vibration of the base upon which the switch is mounted.

An additional object of the invention is the provision of such a device which will act not only under conditions of severe vibration, but on shock loads, severe inertia, or other conditions of imbalance or malfunction.

A further object of the invention is the provision of a switch which will act upon undue vibration in either a vertical or a horizontal plane.

A specific object of the invention is the provision of a device of this character adapted to be installed on an oil well pumping unit which operates with a counterweight attached to a crank operating from a gear reduction unit to operate a string of rods inside the bore of an oil well. As conducive to a clearer understanding of the invention it may here be pointed out that under the above conditions the weight of the sucker rod and oil column is finely balanced with relation to the counterweight, and oil is lifted by reciprocating action of a walking beam. When the rods break or become disconnected a very heavy unbalance is thrown on the entire unit which causes severe vibration and shock which, if not promptly stopped, could cause the unit, with a heavy power unit, to shake itself off the foundation or otherwise do extensive damage. By virtue of the instant invention under such conditions the power unit of such a well pump is immediately shut down when such an unbalanced condition occurs. The device will also operate with an oil well pumping unit under conditions of breakage of chains or gears, or failure of bearing or wrist pins, or any other components which will occasion severe vibration or shock loads.

A further specific object of the invention is the provision of a device of this character which may be employed on gas compressor systems or pipe lines where loss of load or transmission equipment failures can cause excessive shock load and vibration which could result in extensive damage.

A more general object of the invention is the provision of a vibration responsive switch which is applicable to any machine tool or other equipment where it is desirable to protect the equipment from shock or vibration.

Still other objects reside in the combinations of elements, arrangements of parts, and features of construction, all as will be more fully pointed out hereinafter and disclosed in the accompanying drawing wherein:

FIGURE 1 is a perspective view, partially in elevation, and partially in section, of one form of apparatus embodying features of the instant inventive concept.

FIGURE 2 is a vertical sectional view taken substantially along the center line of the device of FIG. 1.

FIGURE 3 is a sectional view taken substantially along the line 3—3 of FIG. 2 as viewed in the direction indicated by the arrows.

FIGURE 4 is a sectional view taken substantially along the line 4—4 of FIG. 2 as viewed in the direction indicated by the arrows; and FIGURE 5 is a sectional view taken substantially along the line 5—5 of FIG. 2 as viewed in the direction indicated by the arrows.

Similar reference characters refer to similar parts throughout the several views of the drawing.

Having reference now to the drawing in detail, the device of the instant invention is generally indicated at 10, and comprises a casing 11 which may be of generally rectangular configuration and which is provided with an open side closed by an access plate 12 held in position by suitable screws 13 and the like.

A mounting bracket 14 of any desired type is suitably secured to the casing 11 in any desired locality, and is adapted to secure the casing and its associated mechanism to any desired base or support 15, which comprises a component of a machine tool or the like which might be injured by excessive vibration.

An opening 16 is provided in one of the walls of the casing, and is adapted for the reception, through a suitable bushing 18, of a conduit 17 containing wires which comprise components of any suitable circuit, such as the operating circuit of the apparatus to which the switch is applied, an alarm circuit, or any other desired circuit which it is desired to make or break upon improper functioning causing excessive vibration in the apparatus, and hence in the switch housing.

Interiorly of the housing or casing 11, there is provided a base plate 20, which may include angularly disposed brackets 21, which are apertured to receive screws 22 or the like for securing the base plate and its associated mechanism to one of the walls of the casing.

Mounted on base plate 20 there is an L-shaped supporting bracket including a horizontal supporting leg 23 and a vertical leg 24. A latch plate 25 is mounted on a pin 26a, which is integrally formed at the top of the vertical leg 24 and extends through an oversize hole adjacent the end of the plate 25 to permit both vertical swinging movement and horizontal swiveling movement of the plate. Latch plate 25 has thereon latch arm 26, which is formed with a notch 27 for a purpose to be more fully described hereinafter. A threaded bolt 28 extends outwardly from the free end of latch arm 26 and has a movable weight member 29 threaded thereon for adjustment of the latch plate.

A tongue 30 extends rearwardly from plate 25 behind the pin 26a and has secured thereto one end of a coil spring 31, the opposite end of which is mounted on a horizontally positioned pin 32 secured to the upright or vertical leg 24. Tongues 33—33 are formed on the opposite sides of plate 25 adjacent the pin 26a, and have secured thereto the ends of a pair of springs 34—34, the opposite ends of which are fixed to offset arms 35—35, which project from the opposite sides of a vertical plate 36, which is mounted on the base plate 20, and which includes a horizontal arm 37 which overlies the latch plate 25. A nylon adjusting screw 38 extends through a threaded nut 39 in arm 37, and engages the upper surface of the latch plate 25 for adjustment purposes.

A removable plastic dome 40 is mounted in a suitable opening in the top of casing 11 directly above the adjusting screw 38 to permit access thereto for adjustment purposes.

A swinging latch contact plate 45 includes at its lower end a pair of right angularly disposed flanges 46 through which there extends a pivot 47 which is carried by lugs 48—48 on the base plate 20, and which is surrounded by coil spring 49, which normally biases the latch plate outwardly to the left (FIG. 2), and into engagement with the notch 27 on the latch arm 26. The plate 45 has an opening 50 therein, the top portion of which 51 is provided with a depending tongue 52 which engages in the notch 27 on the latch arm 26, under normal conditions.

A laterally projecting arm 54 on the latch plate 45 carries on opposite sides thereof contacts 55 and 56 which are adapted selectively to engage opposed contacts 57 and 58 carried by spring arms 59 and 60, respectively, which are mounted on the base plate 20. An additional contact 61 may be carried by the opposite side of the latch plate 45, for engaging a contact 62 carried by a similar spring arm 63, which is mounted on the base plate 20 on the opposite side of the latch arm 26.

All of contacts 55, 56, 57, 58, 61, and 62 are suitably connected by appropriate wiring, schematically indicated in part at 64, to terminals 65 depending from base plate 20, the terminals being in turn suitably connected to the wiring entering through conduit 17, which latter is connected in any appropriate circuit. A cylinder 66 is mounted on the horizontal leg 23 on the supporting bracket, and extends upwardly into close proximity to the underside of the base plate 25. This cylinder may comprise merely a stop of insulating material, or may comprise an electromagnet which may be energized for breaking the circuit independently of vibrational effects for other purposes, such, for example, as described in my prior Patent No. 2,467,333 entitled "Automatic Safety Ignition Switch" dated April 12, 1949, or my co-pending application, similarly entitled, Serial No. 14,096, filed March 10, 1960, now Patent No. 2,992,303.

A reset button 70 is mounted in a recess 71 in a threaded bushing 72 which extends through a suitable opening 73 in the wall of casing 11, the bushing being secured in position as by means of a lock nut 74. A stem 75 of insulating material is connected to the button 70 and extends into the interior of the casing in close proximity to a knob 76 on the latch plate 45. When the button 70 is pressed inwardly, the latch plate 45 is moved to set position and engages behind the notch 27 to hold the latch plate 25 in a position and thus contacts 55 and 57, illustratively, are engaged, so that the circuit in which the switch is associated is in operative condition.

Excessive vibration of the machinery in a vertical plane will cause the latch plate 25 to vibrate similarly vertically, the vibration being amplified by the inertia occasioned by the movable weight 29, and when the vibration reaches an excessive limit the notch 27 on the latch arm 26 will be disengaged from the tongue 52 on the latch plate 45, whereupon the coil spring 49 will bias plate 45 into a position to disengage contacts 55 and 57 and engage contacts 56 and 58, for example, or contacts 61 and 62, to ground out the apparatus, or otherwise break the circuit to stop the machinery or actuate a suitable audible or visual alarm, or for any other desired purpose. It is to be noted that the coil spring 31 serves normally to bias the latch plate 25 upwardly into its latching position.

Similarly, vibration in a horizontal plane will occasion relative swinging movement of the latch plate 25 about pin 26a. Such vibration of the apparatus in a horizontal plane will thus disengage the notch 27 on the latch arm 26 from one or the other of the sides of tongue 52 on the latch plate 45, and the plate 45 will then similarly be forced forwardly by the coil spring 49 to engage or disengage the associated contacts.

A projection 80 on the latch arm 26 adjacent the threaded member 28 limits the forward swinging movement of the latch plate 45 so that the plate, after disengagement from the notch 27 in the latch arm 26, is in position for convenient resetting by means of the button 70.

A colored flag 81 is conveniently positioned on the side of the latch plate 45 and so arranged as to be visible through an opening 82 in the side wall of casing 11, the arrangement being such that the flag becomes visible when the latch plate 45 has been swung forwardly and the switch is in its open or inoperative position. Obviously, adjustment of the threaded weight member 29 and/or the screw 38 will control the relative sensitivity of the apparatus to vibration.

From the foregoing it will now be seen that there is herein provided an improved vibration responsive switch which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A vibration responsive switch comprising a housing, a base plate in said housing, an upright on said base plate, a latch plate mounted on said upright for vertical and horizontal movement, a latch arm carried by said latch plate having a notch formed therein, a second latch plate having a central opening therein and a depending tongue extending into said opening, means pivotally mounting said second latch plate on said base plate in vertical relation with said arm extending into said opening and said tongue engaging in said notch, spring means biasing said latch plate in a direction to engage said tongue with said notch, whereby vibration of said housing disengages said tongue from said notch, contact means operable by movement of said second latch plate to control a circuit, an arm carried by said base plate overlying said first latch plate, and adjustable screw means carried by said last-mentioned arm for varying the relative position of said tongue in said notch.

2. A vibration responsive switch comprising a housing, a base plate in said housing, an upright on said base plate, a latch plate mounted on said upright for vertical and horizontal movement, a latch arm carried by said latch plate having a notch formed therein, a second latch plate having a central opening therein and a depending tongue extending into said opening, means pivotally mounting said second latch plate on said base plate in vertical relation with said arm extending into said opening and said tongue engaging in said notch, spring means biasing said second latch plate in a direction to engage said tongue with said notch, whereby vibration of said housing disengages said tongue from said notch, contact means operable by movement of said second latch plate to control a circuit, an arm carried by said base overlying said first latch plate, adjustable screw means carried by said last-mentioned arm for varying the relative position of said tongue in said notch, and an adjustable weight carried by the end of said latch arm.

3. A vibration responsive switch comprising a housing, a base plate in said housing, an upright on said base plate, a latch plate mounted on said upright for vertical and horizontal movement, a latch arm carried by said latch plate having a notch formed therein, a second latch plate having a central opening therein and a depending tongue extending into said opening, means pivotally mounting said second latch plate on said base in vertical relation with said arm extending into said opening and said tongue engaging in said notch, spring means biasing said second latch plate in a direction to engage said tongue with said notch, whereby vibration of said housing disengages said tongue from said notch, contact means operable by movement of said second latch plate to control a circuit, an arm carried by said base overlying said first latch plate, adjustable screw means carried by said last-mentioned arm for varying the relative position of said tongue in said notch, and adjustable weight carried by the end of said latch arm, and a re-set button extending exteriorly of said housing for moving said second latch plate and said tongue into notch engaging position.

4. A vibration responsive switch comprising a housing, a base plate in said housing, an upright on said base plate, a latch plate mounted on said upright for vertical and horizontal movement, a latch arm carried by said latch plate having a notch formed, a second latch plate having a central opening therein and a depending tongue extending into said opening, means pivotally mounting said second latch plate on said base plate in vertical relation with said arm extending into said opening and said tongue engaging in said notch, spring means biasing said plate in a direction to engage said tongue with said notch, whereby vibration of said housing disengages said tongue from said notch, contact means operable by movement of said second latch plate to control a circuit, an arm carried by said base plate overlying said first latch plate, adjustable screw means carried by said last-mentioned arm for varying the relative position of said tongue in said notch, an adjustable weight carried by the end of said latch arm, a re-set button extending exteriorly of said housing for moving said second latch plate and said tongue into notch engaging position, said housing having an opening therein, and an indicator carried by said second latch plate selectively exposable behind said opening when said tongue is disengaged from said notch.

5. A vibration responsive switch comprising a housing, a base plate in said housing, an upright on said base plate, a latch plate mounted on said upright for vertical and horizontal movement, a latch arm carried by said latch plate having a notch formed therein, a second latch plate having a central opening therein and a depending tongue extending into said opening, means pivotally mounting said second latch plate on said base plate in vertical relation with said arm extending into said opening and said tongue engaging in said notch, spring means biasing said second latch plate in a direction to engage said tongue with said notch, whereby vibration of said housing disengages said tongue from said notch, contact means operable by movement of said second latch plate to control a circuit, an arm carried by said base plate overlying said first latch plate, adjustable screw means carried by said last-mentioned arm for varying the relative position of said tongue in said notch, an adjustable weight carried by the end of said latch arm, a re-set button extending exteriorly of said case for moving said second latch plate and said tongue into notch engaging position, said housing having an opening therein, an indicator carried by said second latch plate selectively exposable behind said opening when said tongue is disengaged from said notch, and spring means engaged with said first-mentioned latch plate normally biasing said latch plate and the latch arm carried thereby into aligned position with said tongue.

6. A vibration responsive switch comprising a housing, a base plate in said housing, an upright on said base plate, a latch plate mounted on said upright for vertical and horizontal movement, a latch arm carried by said latch plate having a notch formed therein, a second latch plate having a central opening therein and a depending tongue extending into said opening, means pivotally mounting said second latch plate on said base plate in vertical relation with said arm extending into said opening and said tongue engaging in said notch, spring means biasing said second latch plate in a direction to engage said tongue with said notch, whereby vibration of said housing disengages said tongue from said notch, contact means operable by movement of said second latch plate to control a circuit, an arm carried by said plate overlying said first latch plate, adjustable screw means carried by said last-mentioned arm for varying the relative position of said tongue in said notch, an adjustable weight carried by the end of said latch arm, a reset button extending exteriorly of said housing for moving said second latch plate and said tongue into notch engaging position, said housing having an opening therein, an indicator carried by said second latch plate selectively exposable behind said opening when said tongue is disengaged from said notch, and spring means engaged with said first-mentioned latch plate normally biasing said latch plate and the latch arm carried thereby into aligned position with said tongue, and additional spring means engaging said first-mentioned latch plate biasing the latter upwardly into tongue engaging position.

7. A vibration responsive switch comprising a base plate, a bracket mounted on the base plate, a first latch plate having a weight at its outer end, a bearing mounting the said latch plate on the bracket for swinging movement in a horizontal plane in response to vibrations in that plane and for pivotal movement in a vertical plane in response to vibration in that plane, spring means connected on the opposite sides of said latch plate for biasing same to a neutral position in the horizontal plane, a second latch plate pivoted at one end for movement in a vertical plane, a movable contact carried by said second latch plate, a fixed contact with which said movable contact cooperates, a complementary latching means on said latch plates releasable when the first latch plate is vibrated in either the horizontal or the vertical plane, additional spring means connected to the first latch plate for biasing same upwardly and holding the complementary latching means engaged, and spring means connected to the second latch plate for biasing same to its disengaged position.

References Cited in the file of this patent

UNITED STATES PATENTS

| | | |
|---|---|---|
| 978,857 | Day | Dec. 20, 1920 |
| 2,589,395 | Kanard | Mar. 18, 1952 |
| 2,698,886 | Statham et al. | Jan. 4, 1955 |